United States Patent [19]

Suzuki

[11] Patent Number: 4,546,928

[45] Date of Patent: Oct. 15, 1985

[54] FOOD PROCESSOR

[76] Inventor: Hajime Suzuki, 13-44, Ajiyoshihakusancho-1-chome, Kasugai-shi, Aichi-ken, Japan

[21] Appl. No.: 598,196

[22] Filed: Apr. 9, 1984

[30] Foreign Application Priority Data

Aug. 31, 1983 [JP] Japan .................... 58-134946[U]

[51] Int. Cl.⁴ ............................................. A47J 43/06
[52] U.S. Cl. ...................................... 241/95; 241/100; 241/273.2; 241/285 A
[58] Field of Search ............. 241/285 R, 95, 285 B, 241/100, 273.1, 273.2, 273.3, 273.4

[56] References Cited

U.S. PATENT DOCUMENTS

| | | | |
|---|---|---|---|
| 1,160,043 | 11/1915 | Clark | 241/273.1 |
| 2,505,114 | 4/1950 | Hayman et al. | 241/273.2 X |
| 2,615,486 | 10/1952 | Marcus | 241/273.1 X |
| 3,858,815 | 1/1975 | Black | 241/273.1 X |
| 4,055,308 | 10/1977 | Ackeret | 241/273.1 X |
| 4,247,054 | 1/1981 | Schulein et al. | 241/273.1 X |

FOREIGN PATENT DOCUMENTS 30596 8/1974 Japan .
21246 5/1977 Japan .

Primary Examiner—Mark Rosenbaum
Attorney, Agent, or Firm—Wegner & Bretschneider

[57] ABSTRACT

A food processor has a container, a guide member having an upper surface on which a vegetable or a fruit is slided reciprocatingly, a semi-tubular connecting member connecting the container to the guide member, and a hollor rectangular parallelepiped frame rotatably surrounding the connecting member. The frame has a plurality of surfaces which carry different kinds of blades for different types of food processing. It is possible to conduct the desired processing of vegetables and fruits easily by rotating the frame with respect to the connecting member as desired.

11 Claims, 5 Drawing Figures

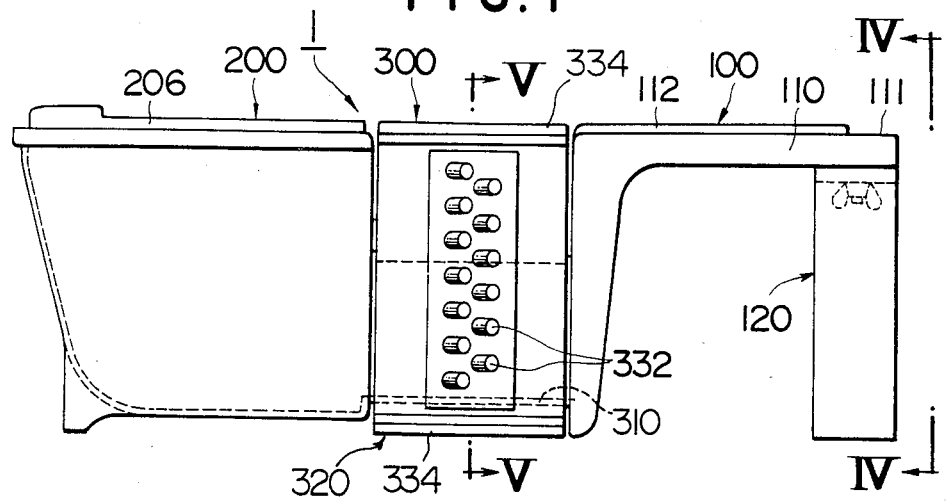
FIG. 1
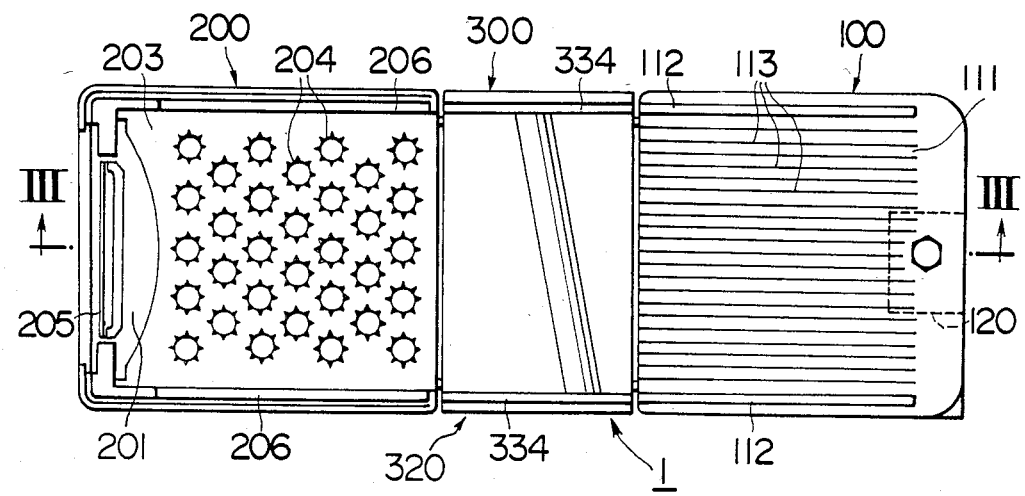
FIG. 2
FIG. 4
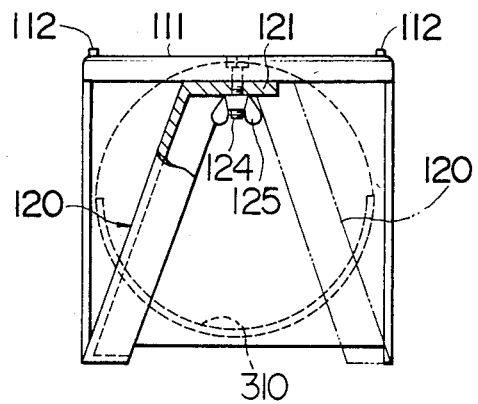

FOOD PROCESSOR

BACKGROUND OF THE INVENTION

1. Field of the Invention

The present invention relates to a food processor suitable for use in processing foods, especially vegetables, fruits and so forth. More particularly, the present invention is concerned with a food processor designed to grate, slice and cut food into thin strips or fine filaments.

2. Description of the Prior Art

Hitherto, such a food processor has been known, in which there is provided a food processor body and a plurality of separate plate means, each having a different type of cutting blade designed for different kinds of processing such as grating, slicing and cutting into thin strips or fine filaments. In use, in accordance with a required processing, an appropriate plate means selected from such plate means group is fitted to the food processor body. Thus, in this known food processor, it is necessary to prepare and store a plurality of plate means and to exchange them each time the processing is changed. Thus, this known food processor is impractical for use and has a complicated construction.

SUMMARY OF THE INVENTION

Accordingly, it is an object of the invention to provide a food processor which permits easy execution of various kinds of food processing as desired, thereby to overcome the above-described problems of the prior art.

The foregoing and other objects and advantages of the present invention will become clear from the following descriptions of an embodiment of the present invention.

BRIEF DESCRIPTION OF THE DRAWINGS

FIG. 1 is a side view of an embodiment of the invention;

FIG. 2 is a plan view of the embodiment shown in FIG. 1;

FIG. 4 is a front view as viewed in a direction of line IV—IV of FIG. 1; and

DESCRIPTION OF THE PREFERRED EMBODIMENT

Figure 3:
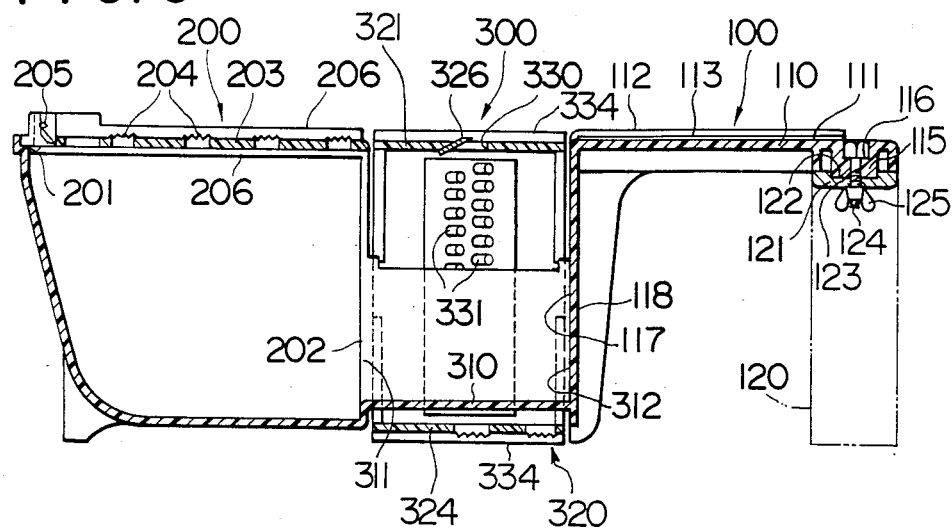
FIG. 3 is a sectional view taken along the line III—III of FIG. 2.

A preferred embodiment of the invention will be described hereinunder with reference to the accompanying drawings. Referring to FIGS. 1 and 2, a food processor embodying the present invention, generally designated at a numeral 1, has guiding means 100, a container 200 and processing means 300. More specifically, the guiding means 100 is provided with a guide member 110 having an L-shaped cross-section, and a bent handle 120. One of the surfaces of one arm of the guide member 110 constitutes a guiding surface 111 on which a vegetable or fruit to be processed reciprocates. Projection guide rails 112, 112 are disposed at both side portions of the guiding surface 111 to extend in a longitudinal direction to guide the vegetable to be processed. A multitude of fine grooves 113 are formed in a portion of the guiding surface 111 between the two projection guide rails 112, 112 to provide a smooth sliding movement of the vegetable on the guiding surface.

As clearly seen in FIG. 3, a short square pillar 115 is formed on one end portion of the guide member 110 remote from the processing means 300 to project away from the guiding surface 111. A bent portion 121 of the handle 120 is provided with a square recess 122 for receiving the pillar 115. A bolt hole 123 through which a bolt 124 extends is formed in the square pillar 115 and one arm of the handle 120. The handle 120 is screwed to the guide member 110 by means of the bolt 124 and a nut 125 cooperated therewith. A seat 116 for a head of the bolt 124 is formed on a portion of the guiding surface 111. As will be clearly understood from FIG. 4, the handle 120 can have two positions as indicated by full lines and chain lines, respectively.

Openings 201 and 202 are formed in the container 200 as shown in FIGS. 2 and 3. One of the openings 201 is detachably closed by a closure lid 203 so that the closure lid 203 aligns with the guiding surface 111. A plurality of grating blades 204 are provided on one surface of the lid 203, while a peeling blade 205 is provided on an end portion of one surface of the lid 203. Projection guide rails 206, 206 are formed on both side portions of both surfaces of the lid 203.

Referance numeral 310 designates a connecting member having a half tube shape and connecting the container 200 with the guide member 110. As shown in FIG. 3, one end portion 311 of the connecting member 310 is in communication with the other opening 202 of the container 200, while the other end opening 312 is in contact with a surface 117 of the other arm 118 of the guide member 110. In the above-mentioned embodiment, the guide member 110, the container 200 and the connecting member 310 are formed as a unit.

Figure 5:
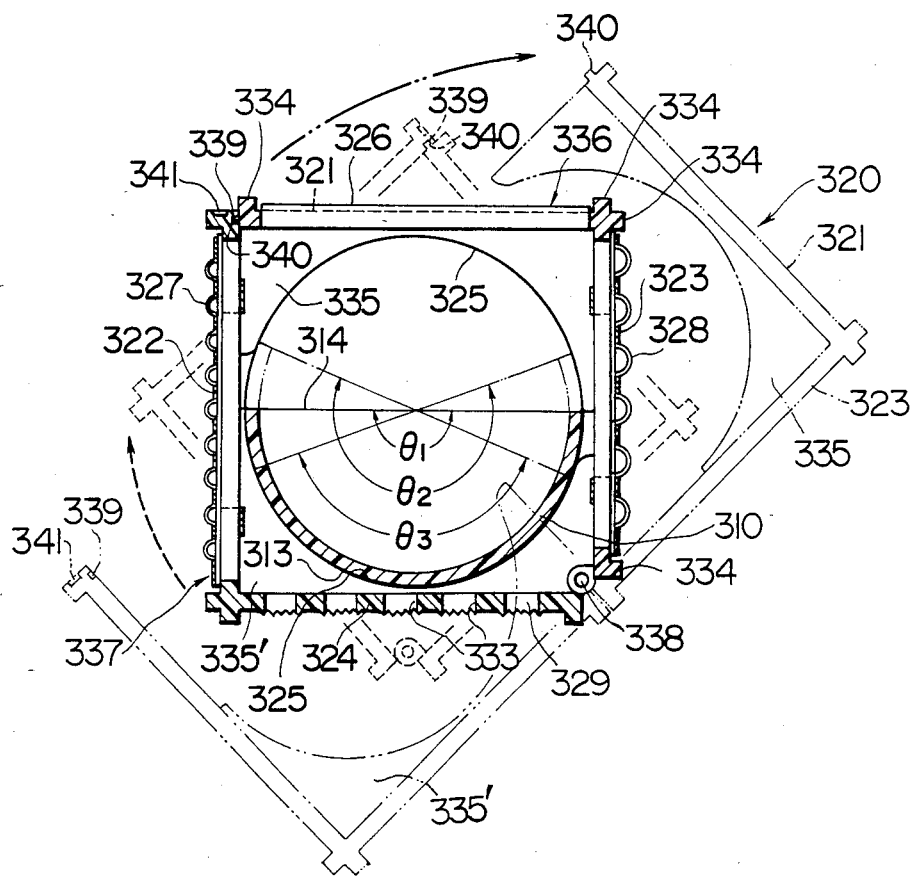
FIG. 5 is a sectional view taken along the line V—V of FIG. 1.

Referance numeral 320 denotes a frame. As shown in FIG. 5 by broken lines, the frame 320 rotatably encloses the half tube shaped connecting member 310. This frame 320 includes an outer periphery constituted by four plates 321, 322, 323 and 324, and an inner wall 325 which closely engages with the periphery 313 of the connecting member 310.

A slicing blade 326, serial blades 327 for cutting into fine filaments, serial blades 328 for cutting into thin strips, and grating blades 329 are provided on respective plates 321 to 324. Each of plates 321 to 324 is provided with openings or serial openings 330 to 333 associated with the respective blades 326 to 329, and projection guide rails 334, 334 which are adapted to align with the projection guide rails 113, 113, 206 and 206.

In the described embodiment, as shown in FIG. 5, the plates 321 and 323 are fixed to a holder plate 335 constituting one inner wall half 325 of the frame 320 so as to form a one half frame unit 336. On the other hand, plates 322 and 324 are also fixed to a holder plate 335' constituting the other inner wall half so as to form the other half frame unit 337. As shown in FIG. 5 by chain lines, one end of each of the frame halves 336 and 337 is hinged around pin 338 so that the frame 320 can be divided into two frame halves for opening. The other end of the frame half 336 is provided with a projection 340 which is adapted to engage with a recess 339 formed in the other end of the frame half 337. It is easily made by an engagement and disengagement between the recess 339 and the projection 340 to attach and detach the frame 320 to the connecting member 310. A reference numeral 341 designates a thumb index.

As another example of the invention, it is possible to use a separating type frame in which the recess and projection are provided on both ends of the frame half.

Each plate of the frame 320 is constructed so as to be aligned with not only the guiding surface 111 but the closure lid 203.

An explanation will be made hereinunder as to an operation of the food processor of the invention having the construction explained hereinbefore.

If a vegetable such as Japanese radish is required to be grated, the frame 320 is rotated to bring the plate 324 having the grating blades 329 into alignment with the guiding surface 111 and the closure lid 203. Then, the radish is grasped by one hand and is reciprocated on the guiding surface 111 and the plate 324. At this time, the processor is preferably placed immovably by the other hand of the user which holds the handle 120. The processed radish drops to an interior of the connecting member through the openings 333 associated with the grating blades 329 and an axial opening 314 of the connecting member 310, and is collected in the container 200. A higher processing efficiency will be attained by use of the grating blades 204 provided on the lid 203. According to the invention, it is possible to accomplish any desired food processing by rotation of the frame 320.

In the illustrated embodiment, the connecting member 310 has a tube half shape, i.e. with an axial opening 314 which has a central angle $\theta_1$ of 180°. This angle, however, is not exclusive and the connecting member 310 can have other central angles such as an angle $\theta_2$ greater than 180° or an angle $\theta_3$ smaller than 180°. In short, it is necessary that the openings associated with the blades are adapted to communicate with the axial opening of the connecting member.

In the described embodiment of the invention, it is possible to direction the handle in either direction as required, so that the food processor can be used handily regardless of whether the user is right or left handed. The frame, which is detachable, can be washed easily after the use.

According to the invention, because it is not required to prepare separate blade plate means, loss of the blade plate means is prevented. Furthermore, various types of the blade plate means are provided on the food processor, so that various kinds of food processing can be readily accomplished.

What is claimed is:

1. A food processor, comprising:
    a horizontal tubular member having a first opening in the top thereof and first and second ends;
    guide means attached to the first end of said tubular member, comprising handle means and a guide surface on which food to be processed may travel in a direction substantially parallel to the longitudinal axis of said tubular member;
    a container attached to the second end of said tubular member, having a second opening in communication with said tubular member, said guide means and said container being connected by said tubular member;
    rotational surface means on said tubular member;
    a hollow frame enclosing said tubular member, comprising:
        wall means having a circular inner edge for engaging said rotational surface means to allow rotation of said frame in a direction substantially perpendicular to the longitudinal axis of said tubular member, around an axis substantially parallel to the longitudinal axis of said tubular member;
        a plurality of plates on the periphery of said frame, each having a third opening in communication with the interior of the frame; and
        a blade means associated with each third opening for processing food;
    whereby food processed by said blade means passes through said third opening into the interior of said frame, through said first opening into said tubular member, and through said second opening into said container.

2. A food processor as claimed in claim 1, wherein said frame is hinged and openable to be removed from said tubular member.

3. A food processor as claimed in claim 1, wherein said frame is formed of two detachable pieces which can be separated to be removed from said tubular member.

4. A food processor as claimed in claim 1, wherein the blade means associated with any one of said third openings is different from the blade means associated with any of the other third openings.

5. A food processor as claimed in claim 1, wherein said handle is adjustable between left- and right-handed positions.

6. A food processor as claimed in claim 5, wherein the blade means associated with said third openings include a slicing blade, grating means, a blade for cutting into strips and a blade for cutting into filaments.

7. A food processor as claimed in claim 1, wherein said container is provided with a removable lid.

8. A food processor as claimed in claim 7, wherein said lid is provided with auxiliary food processing means.

9. A food processor according to claim 8, wherein said auxiliary food processing means comprises a plurality of grating blades and openings associated with said grating blades.

10. A food processor according to claim 1, wherein said tubular member is part-cylindrical and said rotational surfaces comprise the end portions of said tubular member.

11. A food processor as claimed in claim 1, wherein said rotational surface means are provided at each of said first and second ends of said tubular member, and said wall means comprises first and second end walls for said frame having circular inner edges for engaging said rotational surface means.

* * * * *